Sept. 22, 1931.  R. CHILLINGWORTH  1,824,195
HELICOPTER
Filed April 13, 1929
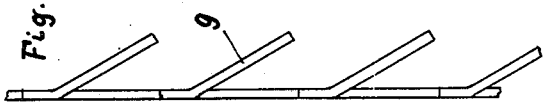
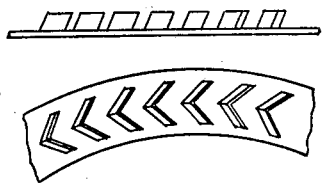
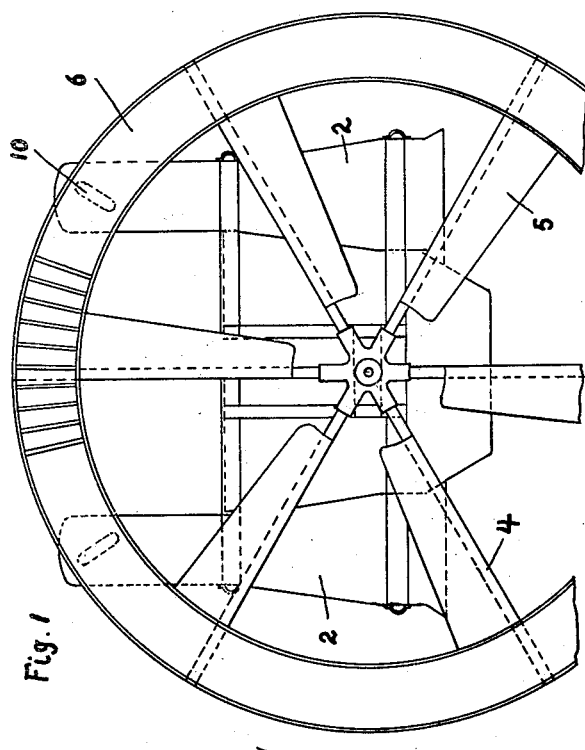
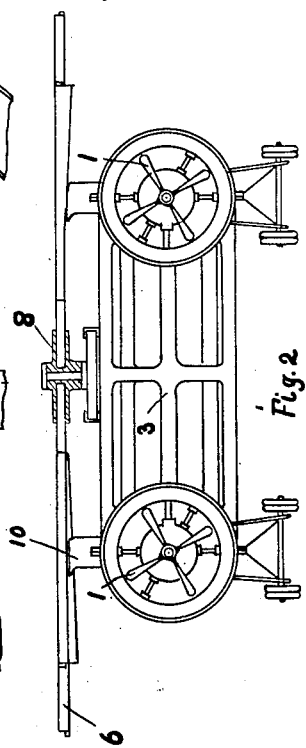
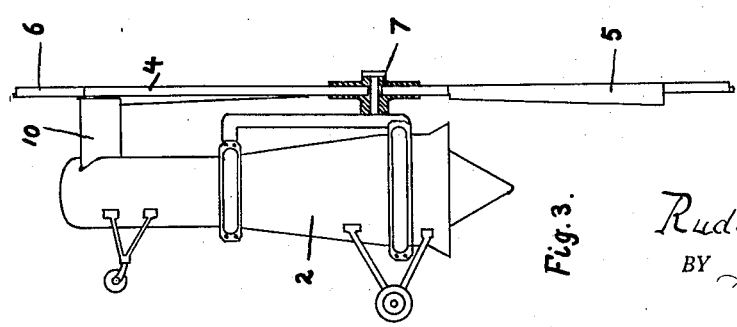
INVENTOR.
Rudolph Chillingworth
BY
ATTORNEYS.

Patented Sept. 22, 1931

1,824,195

UNITED STATES PATENT OFFICE

RUDOLPH CHILLINGWORTH, OF BROOKLYN, NEW YORK

HELICOPTER

Application filed April 13, 1929. Serial No. 354,847.

My invention relates to improvements in aeroplanes and particularly to a helicopter, the lifting screw of which is driven by compressed air, which is directed by means of nozzles or blowers on tubes throwing the compressed air against said screw.

One embodiment of the invention is illustrated on the accompanying drawings in which the aeroplane is shown in:

Fig. 1 in top plan view.
Fig. 2 in front elevation.
Fig. 3 in side elevation, and
Figs. 4 and 5 show vanes on a larger scale.

The current of compressed air is created by one or a plurality of propellers 1 working in one or a plurality of tubes 2, which are held at a predetermined distance from each other by a suitable structure of the fuselage 3.

To produce thrust power, sufficiently powerful and able to lift heavy loads, the beams 4 of the screw blades 5, the number of which must increase in the proportion in which the diameter of the screw is increased, are provided with a ring 6 of sufficiently great circular area or constituting a rim 6 of sufficient width.

This ring formed sheet 6 of circular area is supported by the beams 4, which are held by a hub 7, with its spiders 8.

The rim 6, however, is provided with blades 9 bent at such angles as to utilize the combined forces, to cause the lifting wheel to be rotated.

To assist the ascending movement of the aeroplane another rim with blades may be arranged on the screw-wheel beam 4 having its own nozzles of blast pipes on the tubes which are holding the compressed air, suitable for the circular area of this rim.

Sometimes it may be desirable to increase the speed of rotation of the screw-wheel 6 and in such case the nozzles of the blast pipes 10 for the outer ring 6 have to be closed and the compressed air will find its way automatically to the rim of the smaller diameter of the screw-wheel, or vice versa.

The construction of this helicopter aeroplane is evidently not limited to the form of construction shown but may be different. It is for instance possible to mount on the fuselage for the need of compressed air a ventilator or the like to supply one of the rims or all rims with the necessary compressed air by a central station, also sometimes one rim would be sufficient to produce sufficient power.

Sometimes another rim could be turned in opposite direction by means of transmission elements.

Having now particularly described and ascertained the nature of my said invention, and in what manner the same is to be performed, I declare that what I claim is:

1. In a helicopter of the class described, the combination with the fuselage of a plurality of propellers, tubes held to the fuselage at a predetermined distance from each other in which said propellers work for furnishing currents of compressed air, a lifting screw, means for rotating said lifting screw and nozzles on said tubes for directing the compressed air against the means for rotating said lifting screw.

2. In a helicopter of the class described, the combination with the fuselage of a plurality of propellers, tubes held to the fuselage at a predetermined distance from each other, in which said propellers work for furnishing currents of compressed air, a lifting screw, and nozzles on said tubes and a ring or rim formed sheet of circular area supported by beams on the screw blade, a plurality of blades on said ring or rim bent at an angle thereto against which said currents of compressed air are directed, by said nozzles.

Signed at New York, in the county of New York and State of New York, this 12th day of April, A. D. 1929.

RUDOLPH CHILLINGWORTH.